UNITED STATES PATENT OFFICE.

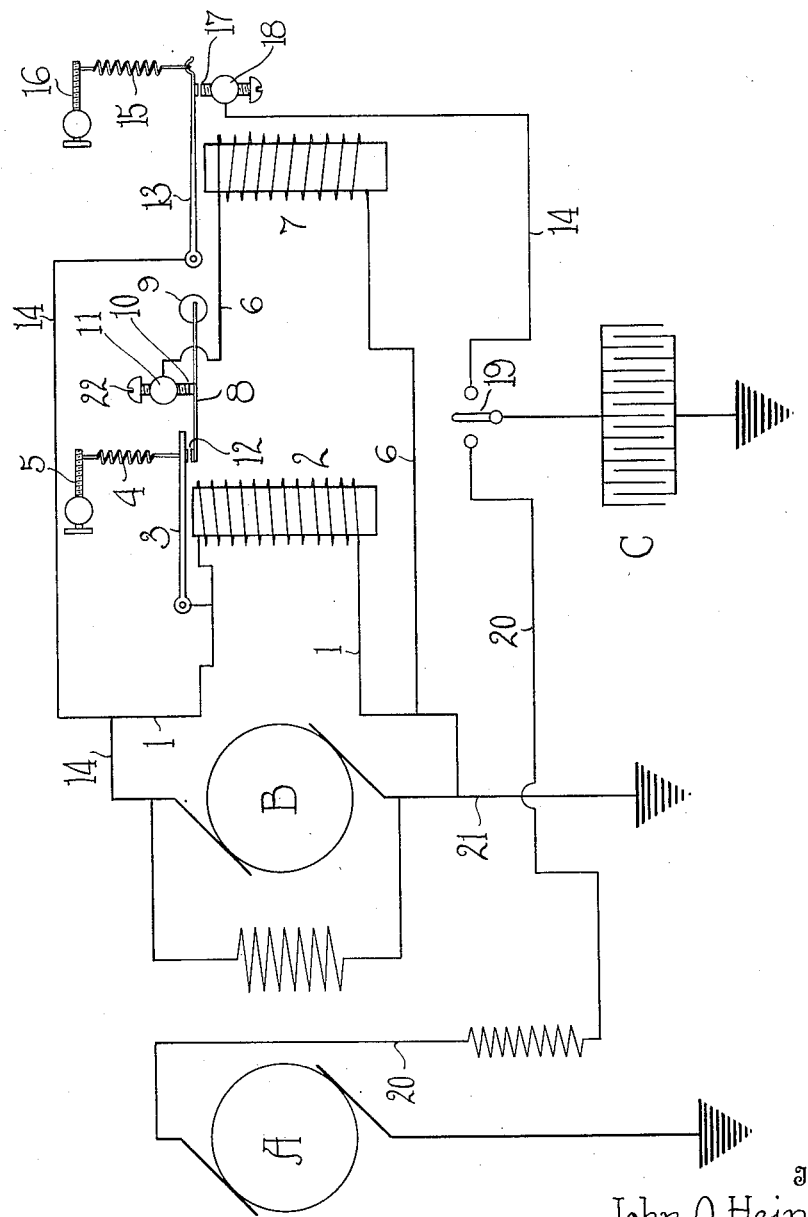

JOHN O. HEINZE, OF DETROIT, MICHIGAN.

BATTERY-CHARGING SYSTEM.

1,150,116.  Specification of Letters Patent.  Patented Aug. 17, 1915.

Application filed May 22, 1914. Serial No. 840,370.

*To all whom it may concern:*

Be it known that I, JOHN O. HEINZE, a citizen of the United States of America, residing at Detroit, in the county of Wayne and State of Michigan, have invented certain new and useful Improvements in Battery-Charging Systems, of which the following is a specification, reference being had therein to the accompanying drawings.

In the use of a dynamo electric machine for charging secondary batteries upon a self propelled vehicle where said dynamo is driven by the motor which propels the vehicle, difficulty is encountered due to the wide variations in the speed of the engine and to obviate this difficulty it has been the common practice to provide a mechanical device which operates to close the main circuit whenever the speed of the dynamo reaches a predetermined point and to open the circuit when the speed falls below that point, other electrically operated means being provided to control the output of the dynamo by a regulation of the electro-motive force, as for instance, when a shunt wound dynamo is employed, by varying the strength of the field magnetism so that the windings of the dynamo will not be burned out.

The output of self-exciting dynamos varies directly as the speed of rotation but this speed may vary within a limited range without materially affecting the efficiency of the dynamo for battery charging purposes, and it is therefore proposed to limit the range of speed through which the dynamo shall be operative, it being entirely cut out and inoperative at all speeds below or above this limited range.

The object of this invention is to provide a simple battery charging system which is positive and efficient in its operation and is particularly adaptable for use upon self propelled vehicles where a storage battery is employed for engine starting, lighting or other purposes.

In order to attain these and other ends, the invention consists, broadly, in providing means electrically controlled by the voltage of the dynamo for closing the circuit connecting the dynamo and battery at a predetermined minimum dynamo speed and charging voltage; and in providing means also electrically controlled by the voltage of the dynamo for breaking the circuit at a predetermined maximum dynamo speed and charging voltage, thus positively opening the circuit between the dynamo and battery at a predetermined minimum charging speed and again at a predetermined maximum charging speed which obviates any liability of injury to the dynamo or battery due to excessive speed and output or reversal of the flow of current.

The invention further consists in the matters hereinafter set forth and more particularly pointed out in the appended claims reference being had to the accompanying drawing in which the system embodying this invention is illustrated diagrammatically.

The system as illustrated is especially adapted for motor vehicles and comprises a motor-generator of any well known type in which the motor indicated at A is driven by current from a secondary battery C and is used for starting the usual internal combustion engine (not shown) forming the prime mover for propelling the vehicle and for driving the generator indicated at B which is of the shunt wound type. Connected within a shunt circuit 1 around the generator B, is an electro-magnet 2 adapted to be energized by a current passing through the shunt circuit. An armature 3 for the magnet 2 is normally held out of contact with the core of the magnet by means of a spring 4 and adjusting screw 5 to which the spring is attached so that the tension of the spring may be varied by the screw. A second shunt circuit 6 is connected in parallel with the shunt circuit 1 around the electro-magnet 2 and in the shunt circuit 6 is a second electro-magnet 7, the coil of which has fewer turns than the coil of the magnet 2. The armature 3 forms a part of the second shunt circuit by being electrically connected at one end with the shunt circuit 1 and a spring contact arm 8 carried by a post 9 with one end adjacent to the free end of the armature 3, is adapted to form another part of the second shunt circuit by being provided with a contact 10 intermediate its ends to engage a suitable contact on a post 11 to which the wire of the shunt 6 is secured. Contacts 12 are provided on the free ends of the armature 3 and spring arm 8, these contacts being adapted to be brought together by the pull of the magnet 2 on the armature to close the second shunt circuit which is normally held open by the spring 4. The spring arm 8 is so arranged relative to the post 11 that the contacts 10 are normally in engagement but when the magnet 2 is energized sufficiently it will be swung first to bring the contacts 12 together and then further movement will flex the spring arm 8 and move the contacts 10 apart, opening the second shunt circuit. The electro-magnet 7 is provided with an armature 13 connected within the main circuit 14 leading from one pole of the generator to one side of the storage battery C. This armature 13 is normally held by means of a spring 15 and adjusting screw 16 away from the core of the magnet and also out of contact with an adjustable contact member 17 carried by a post 18 to which the wire of the main circuit 14 is connected. Any suitable form of switch 19 may be provided for connecting the circuit 14 to the battery or disconnecting it therefrom and connecting a motor circuit 20 to the battery, said motor circuit extending to one pole of the starting motor A for the purpose of energizing the same by current from the battery when it is desired to use said motor for the purpose of starting the engine as previously described.

The battery charging circuit is made up of the wires 14 and the armature 13 which together electrically connect one pole of the generator with one side of the battery and the remaining portion or other leg of the circuit is formed by a wire 21 connected to the other pole of the generator and to the ground which electrically connects the wire with the other side of the battery which is grounded, or the wire 21 may be connected directly with that side of the battery.

In operation, when the vehicle is moving and the generator B is being driven at slow speed by the engine of the vehicle, said generator will be inoperative for the reason that the main circuit is normally held open by the spring 15 operating to hold the contacts 17 apart. As the speed of the generator is increased to a point where its output reaches a charging minimum which has been previously determined, the current passing through the shunt circuit 1 will energize the magnet 2 sufficiently to draw the armature 3 against the action of the spring 4 into contact with the spring arm 8, thus closing the second shunt circuit. The closing of the second shunt circuit at once energizes the magnet 7 and this magnet operates to move its armature 13 and close the main circuit by bringing the contacts 17 together. The generator is then operative, current flowing from it through the wires 14 to the battery (it being understood that the switch 19 has been previously closed to connect the wire 14 with the battery).

The generator will continue to charge the battery until its speed is increased beyond a maximum charging point which has been arbitrarily fixed. The maximum speed being reached, the electromagnet 2 will be sufficiently energized by the increase in current to further draw the armature 3 toward its core against the action of the spring arm 8 and flex said arm, breaking the contact of this arm with the post 11, thus opening the second shunt circuit 6 and deënergizing the magnet 7. The armature 13 will upon deenergization of the magnet 7 open the main circuit and the generator will again become inoperative.

When this system is used upon motor vehicles, the minimum speed of the generator will correspond with a certain travel of miles per hour by the vehicle, say for example fifteen miles per hour, the resistance offered by the spring 4 to the movement of the armature 3 being adjusted so that the generator will be driven by travel of the vehicle at a rate of fifteen miles an hour before sufficient current will be generated to energize the magnet 2 sufficiently to pull the armature 13 against the action of the spring 4 into contact with the arm 8 to close the secondary shunt and thereby energize the magnet 7 for closing the main circuit.

A screw adjustment 22 for one of the contacts 10 or any other suitable means may be employed to adjust the resistance of the spring arm 8 against flexure so that a considerable extra pull will have to be exerted by the magnet 2 before it will attract its armature 3 sufficiently to flex the arm 8 and break its contact with the contact member 10 carried by the post, to open the secondary shunt circuit and deënergize the magnet 7, so that the main circuit will again be opened. For example, we will say that the arm 8 is so adjusted that an increase of the speed of the vehicle to thirty miles an hour will be required to increase the speed of the generator sufficiently to cause its E. M. F. to rise sufficiently to energize the magnet to the extent required to open the secondary shunt circuit and thereby open the main circuit, rendering the generator inoperative. The adjustment will be made to bring the minimum and maximum speed limits at such a point that during the ordinary every day use of the vehicle it will be traveling within these limits a sufficient proportion of the time to keep the storage battery charged, and the range of speed between the minimum and maximum will be so limited as to obviate the possibility of injury to the generator, or battery.

Obviously many changes may be made in the construction of the several devices and their arrangement without departing from the spirit of my invention and I do not therefore limit myself to the particular form or arrangement shown.

Having thus fully described my invention what I claim is:—

In a battery charging system, the combination with a dynamo and a storage battery, of a normally open main circuit, a normally closed shunt circuit around the dynamo, a normally open shunt circuit around the dynamo, an electro-magnet in each shunt circuit, an armature in the main circuit for the magnet in the open shunt circuit, an armature in the open shunt circuit for the magnet in the closed shunt circuit, and means in the open shunt circuit operated by the armature in said circuit for opening said open shunt.

In testimony whereof I affix my signature in presence of two witnesses.

JOHN O. HEINZE.

Witnesses:
LEWIS E. FLANDERS,
G. E. MCGRANN.